United States Patent [19]

Burgess, Jr.

[11] 3,917,052

[45] Nov. 4, 1975

[54] METHOD AND APPARATUS FOR BALANCING ASYMMETRIC WEIGHTS IN A VIBRATORY CONVEYOR

[75] Inventor: Warren C. Burgess, Jr., Avon Lake, Ohio

[73] Assignee: Burgess & Associates, Incorporated, Cleveland, Ohio

[22] Filed: July 19, 1974

[21] Appl. No.: 489,990

Related U.S. Application Data

[63] Continuation-in-part of Ser. No. 312,582, Dec. 6, 1972, abandoned.

[52] U.S. Cl. .................... 198/220 BC; 198/220 DD
[51] Int. Cl.² ........................................ B65G 27/00
[58] Field of Search ............... 198/220 BC, 220 CC, 220 DC, 198/220 DD

[56] References Cited
UNITED STATES PATENTS

| | | | |
|---|---|---|---|
| 2,153,243 | 4/1939 | Flint | 198/220 DC |
| 3,578,142 | 5/1971 | Burgess | 198/220 BC |

*Primary Examiner*—Evon C. Blunk
*Assistant Examiner*—Joseph E. Valenza
*Attorney, Agent, or Firm*—McNenny, Farrington, Pearne & Gordon

[57] ABSTRACT

There is provided a method and apparatus for compensating for asymmetric distribution of weight in a bowl-type parts feeder utilizing a vibratory drive system wherein the primary force generating member including a vibration-inducing oscillating member operates along an oscillatory path which is laterally displaced from the central axis of the drive mechanism including a resilient mounting system. The invention in a preferred embodiment is characterized by the provision for means of adjusting the angle of the path through which the oscillating vibration-inducing member travels with respect to the horizontal. In general, the method utilized in accordance with this invention is characterized by the step of directing an asymmetric force vector to said vibratable member to closely approach balance of dynamic forces caused by said asymmetric weight distribution.

7 Claims, 9 Drawing Figures

VARIATION OF ϒ WITH POSITION OF WEIGHT FOR OPTIMUM PERFORMANCE

FIG. 9

METHOD AND APPARATUS FOR BALANCING ASYMMETRIC WEIGHTS IN A VIBRATORY CONVEYOR

RELATED APPLICATION

This application is a continuation-in-part of my copending application Ser. No. 312,582, filed Dec. 6, 1972 now abandoned.

BACKGROUND OF THE INVENTION AND PRIOR ART

This invention is primarily directed to the field of parts feeders and is conveniently described and illustrated with reference to such devices wherein a generally circular bowl having an upstanding wall is mounted on a plurality of inclined leaf-type springs, usually four or six in number at uniform intervals about a circumference, which are in turn attached to a base. There is provided along the inside wall of the bowl a trackway which leads from the bottom of the bowl upwardly along the wall surface in a spiral or helical manner to a discharge point above the bottom of the bowl and generally near the top marginal edge thereof. The apparatus also includes a vibration-inducing device which may be of electrical, pneumatic, or mechanical nature. By causing the bowl to vibrate on resilient means, e.g., springs, energy is imparted to the parts whereby they are repeatedly raised from the trackway by inertia and while suspended in space, the trackway is moved away and behind the part. When the part returns to the trackway, it lands on a point advanced from its previous position. This operation taking place rapidly and successively causes a movement of the parts along the trackway from the bottom toward the discharge. Such devices are well known in the art.

The present invention has particular adaptability to vibratory parts feeders which are driven by pneumatic free piston vibration-inducing devices. Reference may be had to my prior U.S. Pat. No. 3,367,480, dated Feb. 6, 1968, for a description and illustration of one form of vibratory bowl-type parts feeders with which the present invention is especially useful. The art with respect to vibratory parts feeders, particularly those of the pneumatic type, took a major step forward when it was discovered that by the very simple means of controlling the inlet gas pressure to a pneumatic free piston vibration-inducing device, one was able to control the frequency of oscillation of the free piston and that by controlling the pressure drop experienced by the gas in passing through the vibration-inducing device and exhausting therefrom, one was able to control the amplitude of vibration substantially independently of the frequency. The ability to control these two important parameters by simple valve means on gas lines into and out of a pneumatic free piston vibration-inducing device greatly expanded the field of applicability of parts feeders. It became possible at this point in the development of the art to "tune" a vibratory parts feeding system to the most nearly ideal conditions for transport of a particular part along a spiraliform or helical pathway. In this connection, reference may be had to my U.S. Pat. No. 3,023,738, dated Mar. 6, 1962, for the details of a power control system for pneumatic free piston vibration-inducing devices whereby frequency and amplitude may thus be controlled.

At the time of the development of vibratory bowl-type parts feeders, it was a common expedient to mount the vibration-inducing device for oscillation in a vertical attitude and on the centerline of the drive system, which usually coincided with the centerline or vertical axis of the parts-containing bowl. In this connection, reference may be had to my U.S. Pat. No. 2,285,280, dated May 23, 1961, showing a vibratory parts feeder having a pneumatic free piston vibration-inducing device so mounted.

In the further development of these devices, it was found that greatly increased capacity, or weight of parts within the bowl, could be achieved if the vibration-inducing device were mounted so that the path of oscillation of the vibration-inducing member (e.g., a free piston) was horizontal instead of vertical and at a radial distance away from the vertical axis of the drive system and the circular bowl. Most unexpectedly, capacities or loadings up to 17 times those previously attainable were obtained by this improvement in the art. In this connection, reference may be had to my U.S. Pat. No. 3,367,480, dated Feb. 6, 1968.

Although the foregoing developments have resulted in an increase in the range of materials which can be handled in a vibratory manner and the efficiency with which they are handled and has resulted in an increase in the capacity, when one approaches the limits of these prior art achievements, difficulties are encountered. The prior art has experienced instability and delays in feeding when modifications are introduced into the bowl, for example, modifications for effecting orientation of the parts issuing therefrom. Such orientation is commonly achieved by the application of "tooling" at various points along the trackway to perform various operations on the parts during movement along the trackway. A typical example of such tooling is clearly shown in U.S. Pat. No. 2,807,350, dated Sept. 24, 1957. The introduction of tooling, the application of support members, the design of the trackway, etc., including small changes in thickness of wall members, for example, have been found to introduce instabilities in the mode by which these devices operate when approaching the limits of capacity previously achieved in the art. These instabilities, it has been found, are caused by asymmetric distribution of weight and manifest themselves by "dead spots" or regions along the trackway where motion of the parts slows perceptibly or stops altogether.

Up to this point, it has been believed that the proper means for overcoming asymmetry caused by asymmetric distribution of weight has been to apply a counterbalancing weight at an appropriate place or places on the vibrating apparatus. Illustrative of this practice are patents to Devol, such as U.S. Pat. No. 2,464,216 dated Mar. 15, 1949 and U.S. Pat. No. 2,535,050 dated Dec. 26, 1950, and the patents to Carrier U.S. Pat. Nos. 2,630,209 and 2,630,210, dated Mar. 3, 1953. The art has appreciated the desirability that parts be fed along the tracks of bowl feeders at high uniform speed with a minimum amount of bouncing or instability. Because of the attachment of heavy tooling weights along one side of a somewhat flexible bowl, or the design of the bowl itself, irregular vibrations occur and the movement of the parts being fed becomes erratic at other places in the bowl, and the entire performance of the system is depreciated. The areas of poor performance in many cases will dictate whether or not a particular part can even be handled in a given bowl-type feeder. As indicated, the time-honored way since the 1940's to the present invention for trying to correct nonuniformities in flow has been to "balance" the vibrating bowls by means of attaching weights. The foregoing Devol-type feeders with the vertically acting primary force generating member mounted on the central axis had reasonable success in this respect. If the tooling weight was heavy, however, the balancing weights could well become excessive, causing serious flexing in the bowl structure and further deterioration of the flow of parts, as well as resulting in an increase in the overall weight of the apparatus.

Bowl feeders are usually designed having a basic uniform construction predicated upon a uniform rate of rise in the trackway. The track may or may not spiral outwardly. It is of considerable value to achieve the maximum rate of rise in the trackway without causing deterioration of the ability to feed. Therefore, if an asymmetric movement of the bowl construction or the entire assembly takes place, it is found that one area of the track feeds at a different rate from that of anothr. "Dead spots" where under certain circumstances movement along the trackway may slow or entirely cease have been the bane of craftsmen customizing vibratory bowl feeders since the inception of their use. The first feeders used in any quantity were of the Devol type. The spring angles and various other supports were designed to provide as high a quality and as uniform a quality of flow as possible with the bare untooled bowl. When weights were added in the process of developing means to orient parts, irregular feeding often took place and "dead spots" became a serious problem. Since these had been caused by the addition of weight to the bowl in an asymmetric manner, it seemed only logical that they should be cured by the application of additional weights to balance the vibration structure. This procedure can be likened to the well known and understood process of balancing automobile tires. In either case, there is an increase in overall weight.

Balancing is a complicated procedure and often results in a less than satisfactory feeding action. Large dead spots may be reduced to small or segmented dead or slow spots. Flexures caused by the additional weights will result in other flow irregularities. It is a finite process expensive to conduct and usually unsatisfactory for high production or precision parts handling.

As indicated above, an interesting improvement in the quality of flow with regard to the uniformity of speed and feeding action was achieved with the first resonant synchronous systems such as described in my U.S. Pat. No. 3,023,738 aforesaid. At this time, the art was still using steel springs. Careful research had indicated that a massive base was necessary in order to achieve adequate flow. It was determined to be almost a mathematical certainty in a sidearm drive (U.S. Pat. No. 3,367,480, supra), that the base had to be at least six times the weight of the vibrating bowl, the inducing device, the springs, the tooling. Research had also indicated at this time that satisfactory uniformity of flow was achieved primarily after resonance had been reached. In other words, after the oscillating piston had gone into a synchronous phase 180° opposite that of the vibrating surface, resonance was achieved and both the vibratable member and the vibration-inducing device were at the natural frequency of the combined systems. Very large asymmetric weights in the forms of return shelves and heavy tooling could be applied to such feeders with negligible effects on the feeding quality. Weights extended to the side of the bowl which would virtually destroy all semblance of useful feeding in an electromagnetic-type nonresonant feeder caused little if any effect on the uniformity of flow and action on the parts in a resonant system, within limits.

Because the energy levels achieved by the highly efficient resonant action were considerably greater than that attainable in a nonresonant feeder, steel springs were found to have serious limitations because they failed after relatively short periods of time of use. Fiber reinforced plastic springs were then employed to permit amplitudes of movement or energy levels from four to five times that possible with steel springs. These reinforced plastic springs were at least 20% more flexible in all directions than the steel springs. Following their introduction, tendencies toward irregularities in the flow pattern of parts began to appear more noticeably. At this time, the resonant driving system was mounted to move in a vertical direction with the axis concentric with that of the vibrating surface. Seldom was the asymmetry in feeding due to the addition of tooling weight of any serious consequence. It is important to note that in such resonant drives as were then developed by the prior art, the ratio of balance weights, including the massive base supporting the spring, the drive, and the bowl mounting plate structures, to the weight of vibrating surfaces was quite high as compared with that of the nonresonant type feeders. Depending upon the nonresonant feeder under consideration, the ratio varied from 2–4. The ratio of inertia in a resonant feeding system was determined as being that with which efficient feeding could be achieved. Providing a structure for the elimination of irregular feeding was not a consideration in this ratio determination.

The tremendous unexpected increase in power attained by placing a free piston drive to the side of a vibrating drive plate indicated that this was the ideal situation for carrying loads efficiently and at high speeds. However, it was found that it was accompanied by a very pronounced asymmetric flow pattern. A rather large weight (i.e., the laterally extending arm and the vibrator itself) had been placed at the outer extremity of the vibrating system in an asymmetric manner. The solution provided in the 40's to solve the problem of dead spots was not, however, feasible because adding offsetting weights to the already massive base of a resonant feeder could not be tolerated. Even when such was attempted, it was found to have unreliable effects on improving the situation.

It has now been found, and constitutes the essence of the present invention, that asymmetric distribution of mass in the vibrating system may be effectively and nearly completely controlled by directing an asymmetric force vector to the vibratable member in such an attitude as to closely approach balance of dynamic forces caused by said asymmetric weight distribution. Thus, where a free piston vibration-inducing means is supported on a sidearm, for example, laterally of the central axis of the drive system, the ability to rotate the free-piston member so that the angle along which it oscillates with respect to the horizontal is changed enables tuning the entire structure so that optimum flow characteristics, including maximum speed with minimum bounce, can be achieved for any such system. In a similarly constructed electromagnetically actuated device, rotation of the magnetic field or application of a counterbalancing field will achieve a like result. One of the most surprising and totally unexpected results of this further "tuning" and ability has been that it is now possible to reduce the weight of the massive base by as much as two-thirds without sacrificing any of the feed characteristics. What this does for industrial applications outside of reduction in cost and handling problems is render portable devices which heretofore could be moved only by mechanical means.

In U.S. Pat. No. 2,153,243 to James A. Flint, there is disclosed a screening device of the vibratory type, wherein a vibratory energy source is arranged to impart a conveying action to the screen. The object of the patentee is to be able to handle a wide variety of materials and he accomplishes this by pivotally adjusting the energy source to vary the angle of that source relative to a conveying surface and to thereby vary the direction of movement of that conveying surface. As material characteristics differ, the most efficient angle of vibrating the surface to create a feeding action will differ, as will the most efficient angle for achieving a screening action. By tilting the surface, the patentee may also achieve control of the rate at which material feeds across the surface. The object of the patent is not well met if the patentee does not achieve at all times a nearly uniform distribution of whatever feeding angle he selects at every point on the entire feeding surface. The patentee describes in detail the structure he recommends to approach this desired uniformity of vibratory feeding action at all points on the surface.

While the patentee may vary the feeding action of his vibratory surface over an unlimited or infinite number of angles, the present invention is necessarily limited to one feed angle. The optimum angle of movement of each point along the track in the present invention is necessarily predetermined and this predetermined angle cannot be changed. The patentee, on the other hand, necessarily provides unlimited movement of the angle of the surface, since he has found that many angles are necessary for optimum handling of many materials. The angle of vibration of the surface with respect to the material or articles to be conveyed is of considerably greater importance for bulk materials than it is for the majority of the parts being handled in vibratory bowl feeders. For example, sharp sand conveys well at very flat angles and low amplitudes which are completely unsuited to the conveying of titanium dioxide. For the most part, metal, plastic, glass, and even resilient and semiresilient parts, will convey well at the same angle of movement of the surface. The primary parameters for efficient conveying of parts are frequency and amplitude—not necessarily the angle of movement of the surface. By changing the angle of the surface, therefore, the patentee has another control over the vibratory action exerted on the material. The angle of surface in the present invention cannot be varied.

The patentee achieves uniformity throughout his feeder at all the various angles, using a fixed, rigid structure. In accordance with the present invention, uniformity of feeding at only one predetermined angle is achieved by using not a fixed structure nor a rigid structure, but an energy source which may be varied over a wide range of directions. What the patentee achieves with a rigid structure the present invention achieves with a variable direction energy source.

In summary, therefore, the present invention introduces a new dimension into the field of vibratory conveyance of parts from a bowl-type feeder. It enables the tuning of a tooled structure so as to closely approach the maximum speed and maximum stability achievable in such a system with a given part. It provides the further totally unexpected benefit that the hitherto required massive base weighing at least seven times the weight of the vibrating mass it supported now may be greatly reduced. This invention is particularly useful in devices where different bowls adapted for handling different parts and including different tooling means may be substituted one for another upon the same base and drive system and then "tuned" by adjustment of the angle of oscillation of the vibration-inducing element with respect to the horizontal. Counterbalancing weight need not therefore be used. Instead, there is provided a force vector acting in opposition to or in converging relation to the force vector caused by the vibrating asymmetric mass including the mass of the primary force generating member itself by an adjustment affecting the primary force generating member, e.g., shifting the angle at which it operates or shifting the magnetic field in which it operates. It should be noted that these adjustments may themselves introduce additional asymmetries of mass distribution and thus in most cases we can, as a practical matter, only effect "convergence" of the force vectors as distinguished from ideally matching them equally and oppositely. Nevertheless, the advantages albeit only optimum instead of perfect justify the incorporation of the means to achieve them and the process of doing it.

BRIEF STATEMENT OF THE INVENTION

Briefly stated, therefore, the present invention is in a vibratory bowl-type parts feeder having an asymmetric distribution of weight about a central drive axis and comprising a vibratable member, a base, and resilient means coacting between said member and said base, a primary force-generating member to induce vibration of said vibratable manner, and means for supporting said force-generating member in spaced relation to said central drive axis, the improvement which comprises means coacting with said primary force-generating member for directing an asymmetric force vector to said vibratable member to closely approach balance of dynamic force vectors caused by said asymmetric weight distribution.

This invention also contemplates the method of improving transport characteristics in an asymmetric vibratory bowl-type feeder in which the vibration-inducing means is laterally displaced from the central drive axis which comprises the step of directing an asymmetric force vector to the vibratable member to closely approach balance of the dynamic force vector caused by said asymmetric weight distribution.

When such applied force vector does closely approach balance of the dynamic force vector caused by the asymmetric weight distribution, uniformity in feed rate in all sections of the trackway is most nearly achieved and instability of the parts on the trackway is minimized. Increased production resulting from achieving uniform feeding has exceeded 40% in some instances.

BRIEF DESCRIPTION OF THE DRAWINGS

This invention will be better understood by having reference to the annexed drawings, wherein.

DETAILED DESCRIPTION OF THE DRAWINGS

Figure 1:
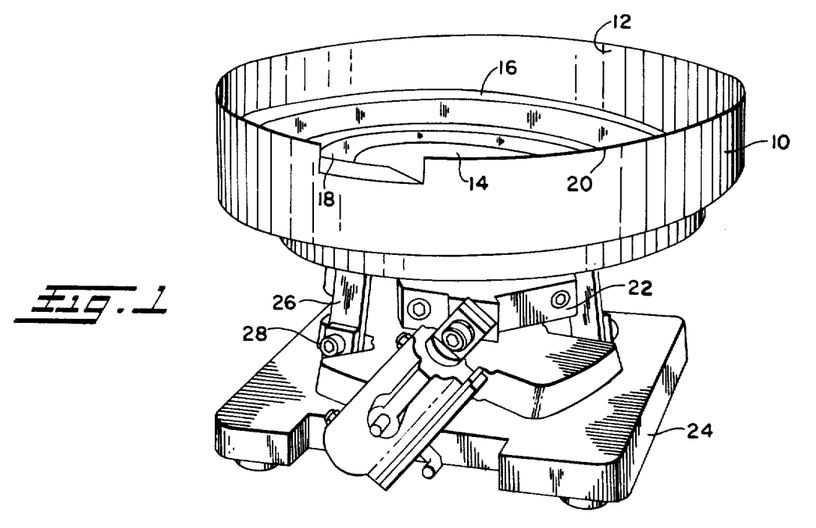
FIG. 1 is an environmental illustration in perspective, showing an application of the present invention in a vibratory bowl-type parts feeder.
Figure 2:
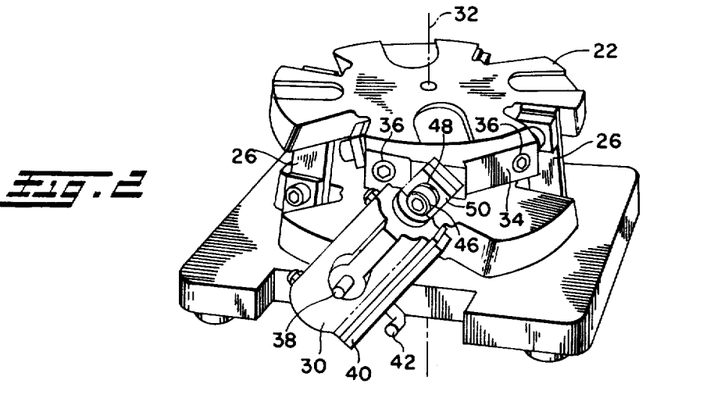
FIG. 2 is an illustration in the same aspect as FIG. 1, showing the apparatus with the bowl removed.
Figure 3:
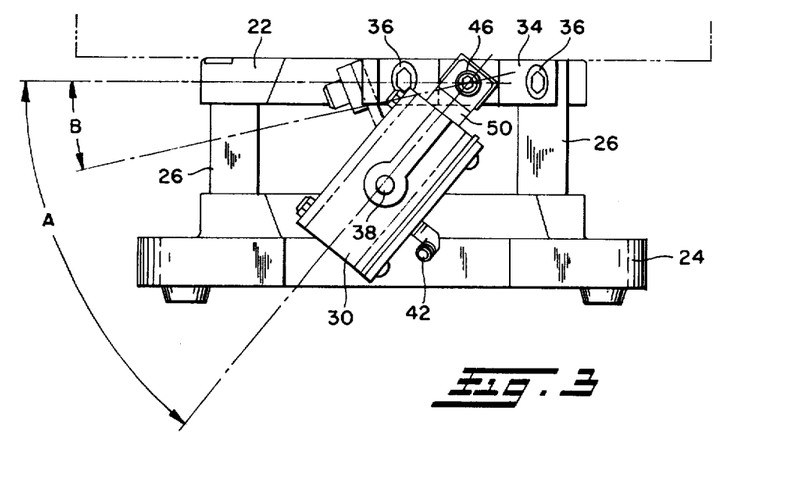
FIG. 3 is a side elevation of the drive system for a vibratory bowl-type feeder such as shown in FIGS. 1 and 2, showing the adjustability of a pneumatic free piston vibration-inducing device relative to the drive system to effect direction of an asymmetric force to the vibratable bowl to offset dynamic forces caused by asymmetric weight distribution.

Referring now more particularly to FIGS. 1, 2, and 3, there is here shown an embodiment of a vibratory bowl-type parts feeder of the resonant type. In general, the apparatus comprises a vibratory member or assembly including, in the illustrated case, a vibratable bowl 10 having a generally circular upstanding wall 12 extending upwardly from a bottom 14. Disposed around the periphery of the wall 12 is a trackway 16 leading from the bottom toward a discharge point 18 adjacent the upper marginal edge 20 of the bowl 10. The bowl 10 is conveniently mounted upon a drive plate 22, and the assembly of the drive plate 22 and the bowl 10 constitute a vibratable member. While it is convenient for the sake of interchangeability to bowls 10 to have the bowl 10 separable from the drive plate 22, it should be understood that the bowl 10 and the drive plate 22 may be an integral structure.

The vibratable assembly composed of the vibratable bowl 10 and the drive plate 22 is mounted upon a base 24 and held in spaced relation therefrom by a plurality of springs 26 secured at their extremities respectively, to the plate 22 and the base 24 by any suitable means, such as bolts 28. The springs 26 in the embodiment shown are desirably flat or leaf-type springs, preferably formed of a fiber-reinforced plastic material such as a glass fiber reinforced epoxy resin. To this point, the structure described is well known, and numerous other examples of vibratable members, bases, and spring supporting systems therefor may be found in the prior art.

Referring now more particularly to FIG. 2, there is here shown a resonant drive system for a vibratable bowl-type parts feeder such as that shown in place in FIG. 1, the bowl having been removed to better show an embodiment of a drive plate useful in accordance with the present invention. As indicated above, the present invention is an improvement upon the structure shown in my U.S. Pat. No. 3,367,480; and, accordingly, the disclosure of that patent is incorporated herein by reference thereto. Instead of the sidearm structure shown in that patent, the drive plate 22, in addition to providing a mounting base for a vibratory partsfeeding bowl such as bowl 10, may also provide the means for mounting a vibration-inducing device such as the free piston vibration-inducing device 30, in spaced relation to a vertical axis disposed centrally of the drive system such as the axis 32. The springs 26 are mounted so that their longitudinal centerlines are equidistant from the drive axis 32. The vibratory motion-inducing motor is mounted in spaced relation to the central drive axis 32 on the drive plate 22 by means of the mounting block 34 suitably secured thereto as by means of socket bolts 36.

Details of the construction of one form of vibratory parts-feeding bowl useful in accordance herewith may be found in my U.S. Pat. No. 3,280,964, dated Oct. 25, 1966, the disclosure of which is hereby incorporated herein by referenc thereto.

The details of internal construction of a free piston vibration-inducing device 30 suitable for use in accordance with the present invention may be found in my U.S. Pat. No. 2,861,548, dated Nov. 25, 1958, particularly in FIGS. 6, 7, 8, and 9 thereof. In the embodiment shown in FIG. 2 of the present application, the pressurized gas inlet is accomplished through a port 38. The exhaust from the opposite ends of the cylinder is collected in the embodiment shown in FIG. 2 in a header 40 and exits through a port 42. A power control system such as that shown in U.S. Pat. No. 3,023,738 in diagrammatic form in FIG. 3 thereof may be connected to the free piston vibration-inducing device 30 in the manner shown in that patent.

By mounting the free piston vibration-inducing device 30 on a mounting block 34 spaced as it is from the drive axis 32, the advantages of a sidearm drive such as disclosed in my aforesaid U.S. Pat. No. 3,367,480 are attained.

The improvements of the present invention are secured in the devices shown in FIGS. 1, 2, and 3 hereof by mounting the vibrator 30 so as to be able to rotate the axis along which the free piston therein oscillates until the position of most satisfactory performance of parts moving along the trackeway 16 in the bowl 10 can be determined. Thereupon, the fastening means, e.g., bolt 46, is tightened down into the mounting block 34 and tightly held thereagainst as by means of a lock washer 48, coacting with the body of the vibration-inducing device 30 through an integrally attached mounting lug 50. The bolt 46 serves as a pin coacting between the mounting block 34 (or sidearm) and the vibrator 30 and about the axis of which the pin the vibration-inducing device is rotatable. In a preferred embodiment the axis of pin 46 is perpendicular to the oscillatory path as shown in FIGS. 1–3 and lies in a horizontal plane which is perpendicular to the central drive axis. It need not bear such an orthogonal relationship.

FIG. 3 shows two angles of significance in the further discussion of the present invention, the angle B being the "ideal angle" hereinafter defined, and the angle A being the determined or optimum angle for the path along which the piston within the vibrator 30 oscillates.

Figure 4:
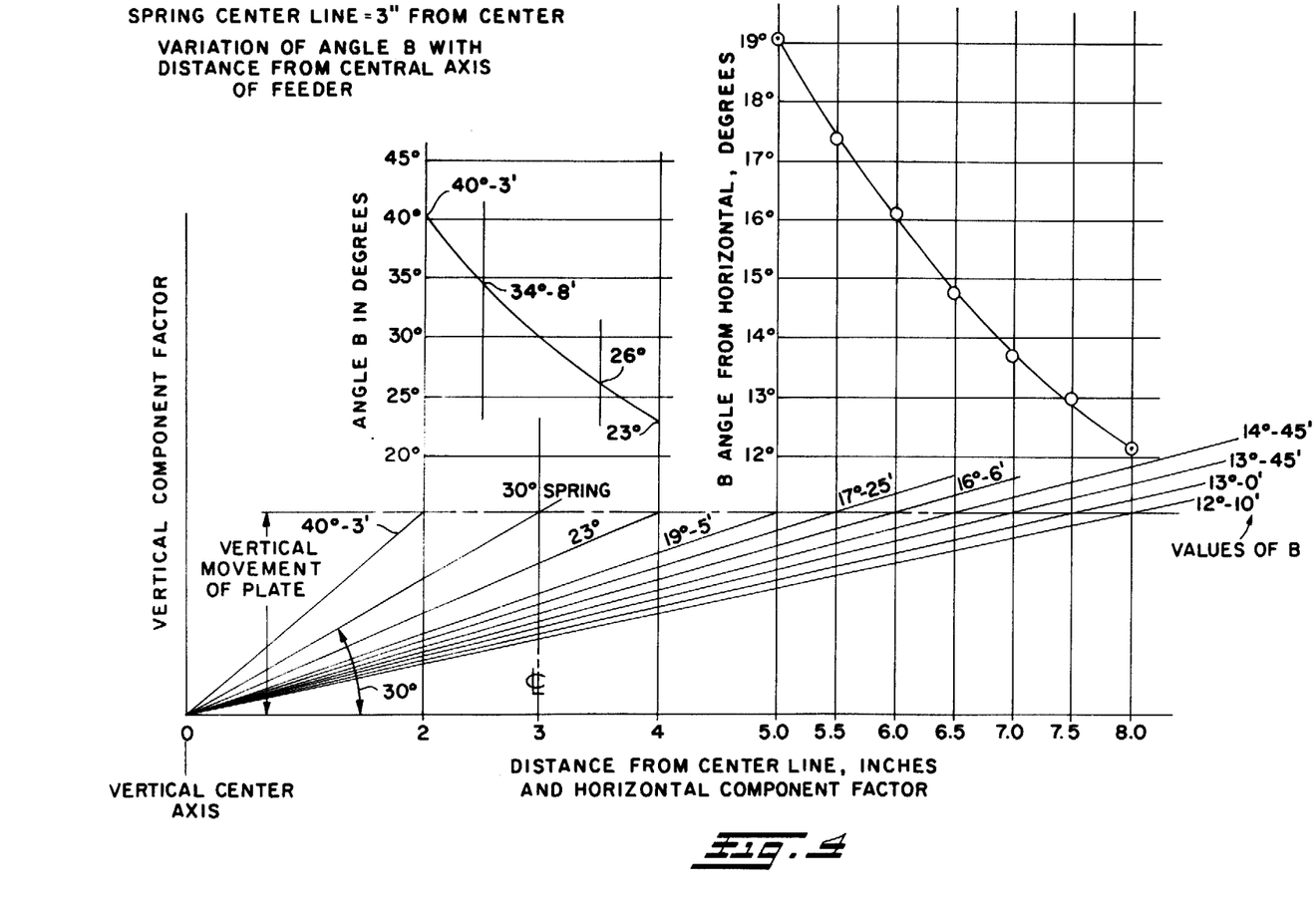
FIG. 4 is a graph showing the variation of the ideal angle (hereinafter defined) with distance from the centerline of the drive axis for a given vertical movement.
Figures 5, 6:
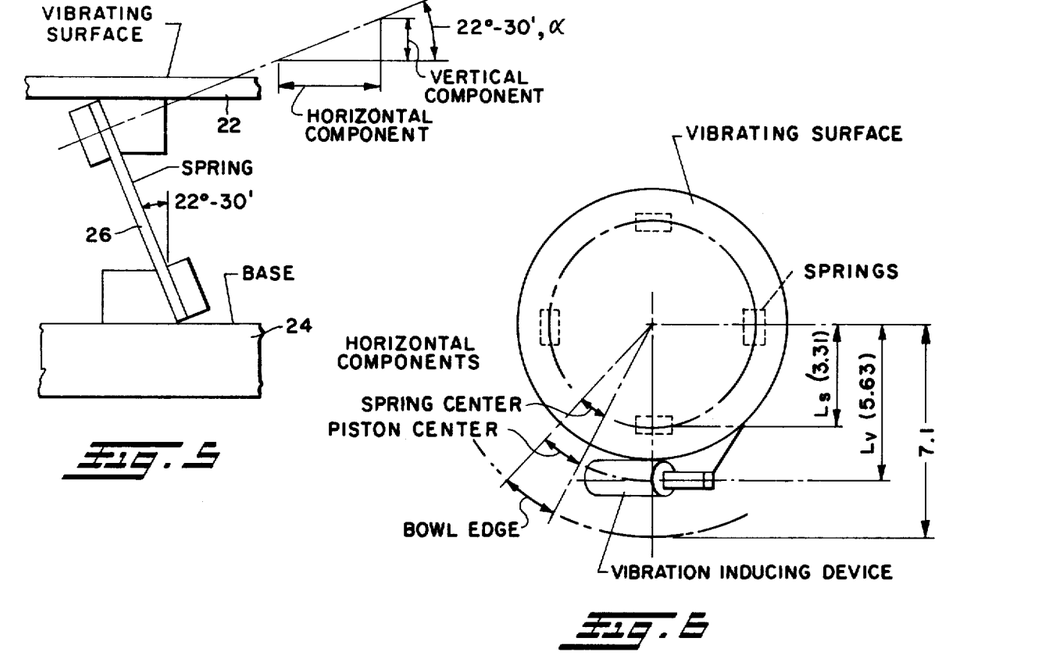
FIG. 5 is a diagrammatic representation of a leaf-type spring on its attachment to a vibration surface and a base and setting forth the vertical and horizontal components of movement during oscillation.
FIG. 6 is a diagrammatic top representation of the geometry of a typical sidearm bowl feeder in accordance herewith.

Mathematically, the ideal angle for this position of the path along which the free piston of vibration-inducing device 30 oscillates is expressed by the formula:

$$B = \arctan \left[ \frac{L_s}{L_r} \tan A \right] \quad (1)$$

wherein $L_s$ is the radial distance of the centerline of the springs from the central axis of the drive system (32 in FIG. 2); $L_r$ is the distance of the centerline of the free piston in the vibration-inducing device (30 in FIG. 2) from the same central axis 32 of the drive system; and alpha is the angle of inclination of the springs 26 with respect to the vertical. FIG. 5 shows graphically the spring angle alpha with respect to the vertical as being 22°30'. FIG. 4 is a graph showing the variation of the ideal angle B with distance from the central axis 32 of a vibratory bowl-type parts feeder. In this particular example, the spring centerline is three inches from the axis 32. The vertical movement is a representation of the vertical component factor using a 30° inclined spring as a point of reference. This is simply a representation of the vertical component of movement of the plate as found experimentally. It has been found that as one moves laterally from the central axis 32 of the drive system, the ideal angle B at which the piston should be disposed changes. This is represented in FIG. 4 and shows the variation of the ideal angle B with distance from the centerline. One would expect that all other conditions being equal, the most satisfactory performance of a sidearm drive bowl-type parts feeder would occur when the angle of disposition of the path of oscillation of the piston or the inertia creating element for inducing vibration would be along the path of the ideal angle B. In practice, this is not the case. The prior art has arbitrarily, and for purposes of convenience, disposed these axes first vertically, and later horizontally, as indicated above. In some cases with multiple drives, the prior art has disposed the axis of oscillation normal to the plane of the springs. In this regard, reference may be had to U.S. Pat. No. 2,658,286. Thus, all of the prior art to this point has failed to provide means for tuning and location of the angle of oscillation of the vibration-inducing member at an optimum angular disposition. Because of asymmetries as above described existing in a given system it may be found that the optimum angle which we call herein gamma may be vertical, or it may be 0°, i.e., horizontal, or it may be exactly perpendicular to the plane of the leaf-type springs 26. Such angular dispositions would occur, however, only as a result of balancing the asymmetries in a given system. Coincidence of the angle of asymmetric balance and one of these three angles in a given system would be purely fortuitous and a highly unlikely occurrence. In accordance with the present invention, the vibration-inducing device is locatable at a predetermined angle which bears the relation such that the force vector induced in the vibrating system by asymmetrically disposed weights is very nearly counterbalanced by an imposed opposing force vector resulting from the angle at which the path of oscillation is found best to be disposed by trial and error methods.

FIGS. 6, 7, 8, and 9 diagrammatically and graphically represent a specific example and provide data for a bowl-type parts feeder such as shown in FIGS. 1, 2, and 3. Taking a simple untooled bowl such as shown in FIG. 1 and having the dimensions shown in FIG. 6, by the geometry thereof the ideal angle of a piston located at 5.63 inches from the central axis 32 is 13°40'. In this example, the springs were disposed at an angle alpha of 22°30', and the spring centers were located 3.31 inches from the central axis 32. In order to obtain optimum performance, the bolt 46 was loosened to enable rotation of the vibration-inducing device 30 about the axis of the bolt 46. Optimum performance was obtained when the angle gamma was set at 38°30'. This is nearly three times the angle beta geometrically determined from a rigid structure evaluation.

Figure 7:
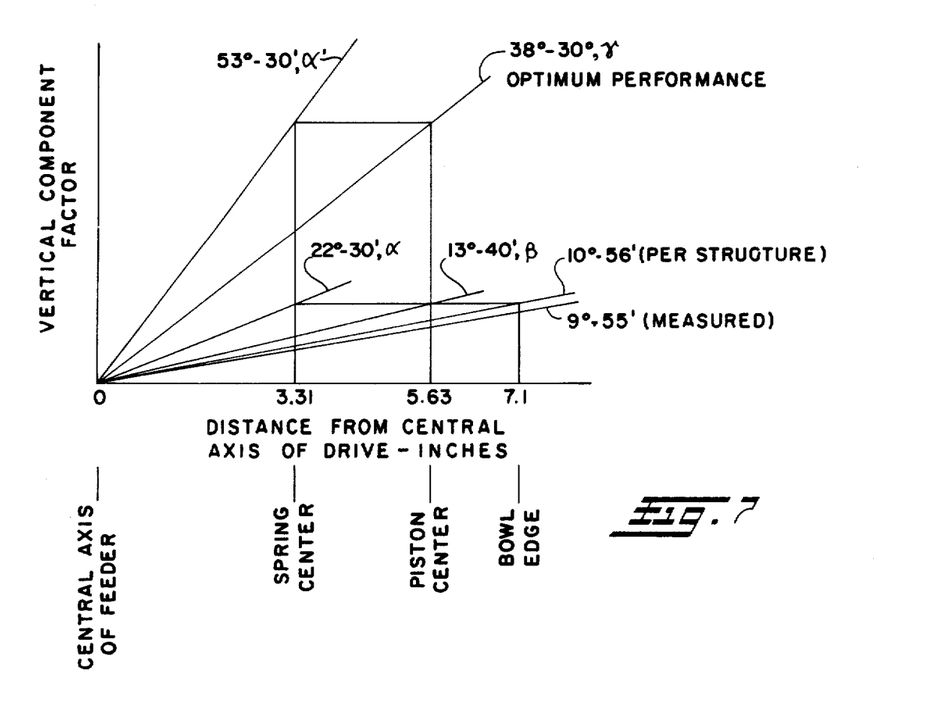
FIG. 7 is a plot of observed and ideal angles at radial points on a given structure.

Still referring to FIG. 7, and considering what is occurring at the edge of the bowl, the ideal angle for a point 7.1 in. from the central axis 32 calculates according to the formula (1) given above to be 10°56'. Actual measurement of the angle at which the outer periphery of a 15-inch bowl is vibrating turns out to be 9°55', a rather close approximation, and surprising in view of the wide divergence between the ideal angle B for the piston of 13°40' and the optimum angle 38°30' for C. The angle $A^1$ located at 53°30' is the predicted angle of the springs which would result in an ideal angle of 38°30' or equivalent to the optimum performance angle gamma which was found experimentally.

Figure 8:
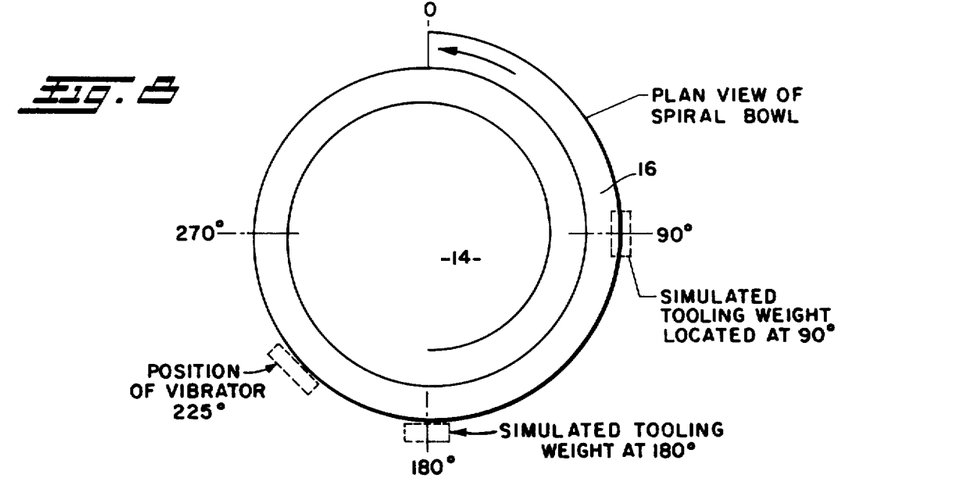
FIGS. 8 and 9 show the variation of the observed angles C with position of a simulated asymmetric weight located at 90° intervals.
Figure 9:
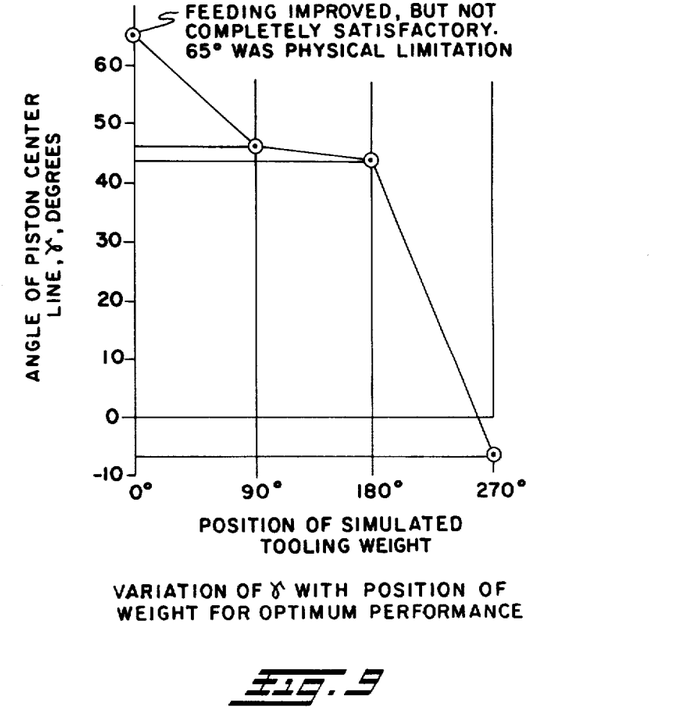

In another test utilizing the geometry illustrated in FIG. 6 and a bowl structured as shown in FIGS. 1, 2, and 3, a heavy weight simulating tooling weight was moved about the periphery of a bowl at 90° intervals. At each of these intervals, the angle C was determined for optimum performance of parts moving along the spiral trackway 16. The vibration-inducing device 30 was located at about 225°. When the simulated tooling weight was located at 0° on the edge of the bowl 16, it was found that an angle C of 65° resulted in improved but not completely satisfactory operation because of the physical limitation of the apparatus and inability to rotate the vibration-inducing device 30 farther. The test indicated that even a higher optimum angle of disposition than 65° would have improved the results still more. When the weight was moved to a position of 90°, the optimum angle C was found to be approximately 46°. At 180° for the location of the simulated tooling weight, the optimum angle C of disposition of the path of oscillation of the free piston in the vibration-inducing device 30 was found to be about 43°. At 270° for the location of the simulated tooling weight on the edge of the bowl as shown in FIG. 8, the angle C was found to be a negative angle of approximately 7°. This graphically demonstrates the asymmetric behavior due to the asymmetric disposition of weight in a bowl-type feeder and the mode of approaching balance. The structure is not ideally rigid and flexure does occur. Such variations induce very complex motions and inertias. The foregoing data was obtained at an amplitude of vibration of 0.060 inch and a frequency of vibration of synchronous or resonant speed for the system being tested.

The same effect may be achieved by altering the magnetic force field in which a vibrating member oscillates to induce an asymmetric force vector therein for convergence in a counter-balancing way with the force vectors generated by the asymmetric disposition of weights about the vibrating member in an electromagnetic device. In the preferred embodiments of the present invention, however, it is found that best results are secured in a resonant system.

What is claimed is:

1. In a vibratory bowl-type parts feeder having an asymmetric distribution of weight about a central drive axis and normally nonuniform transit of parts therein, said feeder comprising a generally circular vibratable member having an upstanding wall and an inclined trackway disposed around the inner surface of the wall and extending from the bottom of the bowl generally upwardly to an exit therefrom; a base; and resilient means including a plurality of leaf spring stations disposed about said central drive axis in which the leaf springs are inclined at a predetermined angle, the ends of said springs being rigidly fixed, respectively, to said vibratable member and said base; a primary force generating member having a straight line axis of oscillation lying in a plane normal to a radius extending from said central drive axis for inducing vibration of said vibratable member; and means for supporting said primary force generating member in spaced relation to said central drive axis; the improvement of which comprises in combination therewith, means for angularly adjusting the path of said straight line axis of oscillation within said plane and means for setting said primary force generating member at the adjusted angle, whereby the direction of the force vector generated by said primary force generating member and directed to said vibratable member closely approaches balance of the asymmetric inertia caused by said asymmetric distribution of weight and the character of transport of parts is rendered more nearly uniform in the various sectors of said trackway.

2. A vibratory bowl-type parts feeder in accordance with claim 1, wherein the primary force generating member is a free piston vibration-inducing device in which the piston oscillates along an oscillatory path.

3. a vibratory bowl-type parts feeder in accordance with claim 1, in which the angular adjusting means is a pin coacting between the supporting means for said primary force generating member and said primary force generating member about which said primary force generating member is selectively rotatable.

4. A vibratory bowl-type parts feeder in accordance with claim 3, in which said pin is the shank of a cap screw, and the means for setting said primary force generating member at the adjusted angle include a threaded socket in the support means, threads on one end of said shank adapted to threadedly fit in said threaded socket, and an enlarged head on the other end of said shank.

5. A vibratory bowl-type parts feeder in accordance with claim 1, wherein the primary force generating member is adjustably rotatably mounted on said supporting means.

6. A vibratory bowl-type parts feeder in accordance with claim 2, also including means for fixing the location of the path of oscillation of the piston.

7. The method of improving the transport characteristics of parts moving along a trackway in a vibratory bowl-type parts feeder comprising a generally circular vibratable member having an upstanding wall and an inclined trackway disposed around the inner surface of the wall and extending from the bottom of the bowl generally upwardly to an exit therefrom; a base; and resilient means including a plurality of leaf spring stations disposed about said central drive axis in which the leaf springs are inclined at a predetermined angle, the ends of said springs being rigidly fixed, respectively, to said vibratable member and said base; a primary force generating member having a straight line axis of oscillation lying in a plane normal to a radius extending from said central drive axis for inducing vibration of said vibratable member; and means for supporting said primary force generating member in spaced relation to said central drive axis; which comprises the steps of angularly adjusting the path of said straight line axis of oscillation within said plane to direct the force vector generated by said primary force generator and directed to said vibratable member to closely approach balance of the asymmetric inertia caused by said asymmetric distribution of weight, and setting said primary force generating member at the adjusted angle.

* * * * *